Patented Oct. 21, 1930

1,779,272

UNITED STATES PATENT OFFICE

CHARLES ALBERT HEBERLEIN, OF MAURER, NEW JERSEY, ASSIGNOR TO AMERICAN SMELTING AND REFINING COMPANY, OF NEW YORK, N. Y., A CORPORATION OF NEW JERSEY

PROCESS FOR RECOVERING ARSENIC, ANTIMONY, AND TIN FROM MIXTURES OF THEIR SALTS

No Drawing.   Application filed May 21, 1926. Serial No. 110,618.

This invention relates to a process for the fractional separation of metals from a mixture of the sodium salts of such metals, and, more particularly, relates to the separation of the salts of tin, arsenic and antimony resulting from the combined treatment of metals by caustic soda and sodium nitrate.

According to the invention, the salts of tin, arsenic and antimony resulting from the purification of lead by the so-called Harris process, using as reagents caustic soda and sodium nitrate, are separated from one another in a novel and efficient manner by making use of the differing solubilities of the different salts in water at different temperatures. The salts to be separated may result not only from this process but from any process and may be a mixture of sodium stannate, sodium arsenate and sodium antimonate, the several salts existing in any proportion.

According to the invention, these three salts in any proportion may be mixed with limited amounts of cold water, the sodium stannate dissolving quite readily, the sodium arsenate and sodium antimonate being substantially insoluble. Sufficient water may be provided to dissolve only a portion of the sodium stannate, thereby preventing the other salts from going into solution. The solution may be then filtered, the filter cake containing substantially all of the arsenic and antimony and a portion of the tin. The filtrate is immediately available for treatment to recover the tin by any desired process. The filter cake may be then mixed in a limited amount of hot water, the remaining sodium stannate and sodium arsenate salts dissolving quite readily, the sodium antimonate being substantially insoluble. This solution is filtered, the sodium antimonate being filtered out in the form of a cake. The solution of tin and arsenic may be then cooled, which causes most of the sodium arsenate to crystallize out, after which the solution may be filtered to obtain the filter cake of sodium arsenate. The remaining solution of sodium stannate containing some sodium arsenate may be used as a solvent for dissolving a fresh charge of the original mixture of salts. The process according to the invention, allows the recovery of tin, which is the most valuable of the three metals, and also permits the saving of the free caustic soda entrained or occluded in the mixed crystals of the salts. The tin may be recovered from the concentrated tin solution either directly by electrolysis or by precipitation methods yielding metallic tin or tin oxide, substantially free from both arsenic and antimony.

The invention further consists in the new and novel features of operation and the new and original arrangements and combinations of steps in the process hereinafter described and more particularly set forth in the claims.

The mixture of the three salts, namely, sodium stannate, sodium arsenate and sodium antimonate may be derived from any source, such as products resulting from processes in which lead containing tin, arsenic and antimony as impurities, is purified by the use of sodium hydroxide and sodium nitrate, and the several salts may be present in any proportion.

Between the temperature of 30 degrees C. to minus 12 degrees C. sodium stannate becomes more soluble in water, while conversely sodium arsenate becomes most insoluble as the temperature is reduced below 30 degrees C., particularly when solid sodium stannate is present. At temperatures between 80 degrees C. and 100 degrees C. sodium stannate and sodium arsenate are readily soluble. Sodium antimonate, on the other hand, is substantially insoluble at low temperatures although having a slight tendency to become soluble as the solution becomes hot.

In the pulp or mixture of salts to be treated the crystals of sodium stannate, sodium arsenate and sodium antimonate may be present, for example, in the ratio of 1 part sodium arsenate, 4 parts sodium stannate and 6 parts sodium antimonate together with mechanically occluded or entrained sodium oxyhydrate, sodium chloride and water. A charge of this pulp of, for instance, 30,000 lbs. may be agitated thoroughly in an iron tank as by means of a mechanical stirrer in approximately 25,000 lbs. of water at a temperature preferably between 0 and 25 degrees C. The mixture after agitation is filter-pressed, the cake preferably being dried with cold air, and yields a clear solution containing about 70% of the soluble tin with most of the caustic. This clear tin solution becomes immediately available for the recovery of tin by any of the common and accepted methods.

The proportion of water and pulp is so fixed that only a predetermined amount of the sodium stannate goes into solution. This is to insure that all the arsenic and antimony will remain insoluble in the water, the presence of undissolved sodium stannate preventing the dissolving of the sodium arsenate and sodium antimonate.

The filter cake therefore contains all of the sodium arsenate, all of the sodium antimonate and about 30% of the sodium stannate. This cake is then agitated in hot water at a temperature preferably not exceeding 85° C., the proportions being approximately 1 part of the filter cake to 1 to 1.5 parts of fresh water. Agitation of an hour or more causes all of the sodium arsenate and sodium stannate to dissolve, the sodium antimonate remaining undissolved as it is insoluble under these conditions. This solution is filtered to obtain a clear solution containing all of the sodium arsenate and sodium stannate. The filter cake is pressed hot and steamed and then air blown to make a clean pure cake of sodium antimonate, which cake is ready for reduction to metallic antimony, or for the production of commercial antimony pigment.

The clear and hot filtrate may be then cooled down to a temperature below 25 or 20 degrees C. in a crystallizing tank with agitation to cause most of the sodium arsenate to become crystallized out of the solution. The sodium stannate remaining in solution since this compound becomes increasingly more soluble as the temperature is lowered. A small amount of the sodium arsenate may also remain in solution.

After sufficient arsenic has been crystallized out the solution is filtered, the filter cake being cold air dried. The clear filtrate becomes immediately available for use as the solvent for treating a fresh charge of the original pulp for carrying on the next cycle of the process.

The amount of solvent used for the new charge must be such that approximately 70% of the soluble sodium stannate in the new charge will dissolve in the solution, any loss being made up by addition of fresh water. Complete solution of the sodium stannate is not desired, as by leaving a small amount in the residue, the complete insolubility of the sodium arsenate and antimonate is insured, and sodium stannate solution uncontaminated by them is obtained.

The second cycle begins at the point where the new charge of salts is mixed in the filtrate remaining from the first cycle, and the steps in the second cycle are substantially the same as those in the first. The process is carried on with the same cycle of steps repeated over and over again, a state of stability being reached after the second or third cycle. The amount of solvent used with the fresh pulp added in each cycle is kept such that the solvent in which the fresh pulp is mixed always retains sufficient proportion of sodium stannate from the prior cycle to prevent the dissolving of all of the sodium stannate in the fresh pulp, thereby preventing the other salts from being dissolved.

Thus it will be appreciated that after a number of cycles when a condition of stability is reached, the sodium stannate dissolved in the cold solution after the addition of a new charge, which solution is available for the direct recovery of the tin, may be substantially equal to the amount of sodium stannate in the new charge. Similarly the sodium arsenate which is crystallized out of the filtrate containing both sodium stannate and sodium arsenate may be substantially equal to the amount of sodium arsenate in the new charge.

Although I have shown and described and have pointed out in the annexed claims certain novel features of the invention, it will be understood that various omissions, substitutions and changes in the several steps of the process and in its operation may be made by those skilled in the art without departing from the spirit of the invention.

Having thus described my invention, I claim:

1. The process of separating the salts of sodium stannate, sodium arsenate and sodium antimonate from a mixture thereof by continuously repeating a given cycle, which comprises mixing a charge of said mixture in water at such a temperature to cause the tin salt only to dissolve, the amount of water being such that only a given percentage of the soluble tin salt will dissolve, filtering out the arsenic and antimony salts, mixing said filter cake in hot water at such a temperature to cause the remaining tin and arsenic salts only to dissolve, filtering out the antimony salt, cooling the filtrate to cause the arsenic salt to crystallize out, filtering out the crystallized arsenic salt, mixing a new charge of the original mixture equal to said first charge in said filtrate, the amount of water being such that approximately said given percentage of the soluble tin salt of the new charge will dissolve, and thus repeating the cycle of steps.

2. The process of separating the salts of sodium stannate, sodium arsenate and sodium antimonate from a mixture thereof by continuously repeating a given cycle, which comprises mixing a charge of said mixture in water at a temperature of from 0 to 25 degrees C., the amount of water being such that only a given percentage of the soluble tin salt will dissolve, filtering out the arsenic and antimony salts, mixing said filter cake in hot water at a temperature not exceeding 85 degrees C., filtering out the antimony salt, cooling the filtrate to below 20 degrees C., filtering out the crystallized arsenic salt, mixing a new charge of the original mixture equal to said first charge in said filtrate, the amount of water being such that approximately said given percentage of the soluble tin salt of the new charge will dissolve, and thus repeating the cycle of steps.

3. The process of separating the salts of sodium stannate, sodium arsenate and sodium antimonate from a mixture thereof by continuously repeating a given cycle, which comprises mixing and agitating a charge of said mixture in water at a temperature of from 0 to 25 degrees C., the amount of water being such that only about 70 per cent of the soluble tin salt will dissolve, filtering out the arsenic and antimony salts in the form of a filter cake, mixing and agitating said filter cake in hot water at a temperature not exceeding 85 degrees, filtering out the antimony salt in the form of a cake, steaming and air blowing said cake, cooling the filtrate to below 20 degrees C., filtering out the crystallized arsenic salt, mixing and agitating a new charge of the original mixture equal to said first charge in said filtrate, the amount of water being such that about 70 percent of the soluble tin salt of the new charge will dissolve, and thus repeating the cycle of steps.

4. Process of separating sodium stannate from a mixture with sodium arsenate, which comprises treating the mixture with sufficient water at temperatures below 30 degrees C. to dissolve a portion only of the sodium stannate, filtering off the sodium stannate solution, then treating the mixture with water at temperatures not above 85 degrees C. to dissolve the remaining sodium stannate and the sodium arsenate, cooling the solution to below 30 degrees C. to crystallize the sodium arsenate, and filtering the sodium arsenate from the sodium stannate solution.

5. Cyclic process for separating sodium stannate from a mixture with sodium arsenate, which comprises dissolving a portion only of the sodium stannate at a temperature below 30 degrees C., filtering off the solution, dissolving the remaining sodium stannate and the sodium arsenate in hot water, cooling the solution to below 30 degrees C. to crystallize the sodium arsenate, filtering out the crystals and using the solution remaining to treat a fresh portion of the mixture.

6. Process of separating sodium stannate and sodium arsenate from sodium antimonate, which comprises treating the mixture with cold water to dissolve a portion only of the sodium stannate, filtering off the solution, treating the remaining salts with hot water in amount sufficient to dissolve only the remaining sodium stannate and sodium arsenate and separating the sodium antimonate as a filter cake.

7. Process of separating sodium stannate from a mixture with other salts including sodium arsenate, comprising mixing said mixture with water in such proportion and at such temperature that only part of said sodium stannate will dissolve to insure complete insolubility of the other salts.

8. A process of separating caustic oxysalt which is soluble in a given solvent from a mixture with another caustic salt which has a tendency to dissolve in said solvent, comprising mixing said mixture with said solvent in such proportion that only a given percentage of the soluble salt will dissolve in the solution to insure substantially complete insolubility of the less soluble salt.

In testimony whereof I have hereunto set my hand.

CHARLES ALBERT HEBERLEIN.